United States Patent
Oommen et al.

(10) Patent No.: US 12,498,300 B2
(45) Date of Patent: Dec. 16, 2025

(54) BIOLOGICAL SAMPLE COLLECTION AND DISPENSING SYSTEM

(71) Applicant: MATERIALS AND MACHINES CORPORATION OF AMERICA, Lincoln, NE (US)

(72) Inventors: Abraham Oommen, Lincoln, NE (US); Trevor Craig, Lincoln, NE (US); Matthew Greenleaf, Lincoln, NE (US); Yashitola Wamboldt, Lincoln, NE (US)

( * ) Notice: Subject to any disclaimer, the term of this patent is extended or adjusted under 35 U.S.C. 154(b) by 263 days.

(21) Appl. No.: 17/667,158

(22) Filed: Feb. 8, 2022

(65) Prior Publication Data
US 2023/0251168 A1    Aug. 10, 2023

(51) Int. Cl.
*G01N 1/10* (2006.01)
*A61B 10/00* (2006.01)
(Continued)

(52) U.S. Cl.
CPC ............... *G01N 1/10* (2013.01); *A61B 10/00* (2013.01); *A61B 10/0051* (2013.01);
(Continued)

(58) Field of Classification Search
CPC .. G01N 1/10; G01N 2001/028; B01L 3/5023; B01L 3/5029; B01L 2200/025;
(Continued)

(56) References Cited

U.S. PATENT DOCUMENTS

| 5,091,316 A | 2/1992 | Monthony et al. |
| 2004/0168690 A1* | 9/2004 | Payne ................ B65D 47/0838 128/207.14 |

(Continued)

FOREIGN PATENT DOCUMENTS

| EP | 0643131 | 3/1995 |
| WO | 2004086979 | 10/2004 |
| WO | 2008095458 | 8/2008 |

OTHER PUBLICATIONS

ISR/WO, International Bureau; International application No. PCT/US23/12516; Jun. 26, 2023; 13 pages.

*Primary Examiner* — Helen C Kwok (57) ABSTRACT

A biological sample collection system and dispensing system is described. The biological sample collection system provides for collection and processing of a biological sample (i.e. bodily fluids collected from nose, throat, or other mucosal membrane of an animal or human). The biological sample collection system includes a sample collector and a collection tube. The sample collector provides a structure for sealing the biological sample in the collection tube for further processing without opening the collection tube, and may provide a structure for collecting the biological sample. When the sample collector and collection tube are removably attached the dispensing system is formed. The dispensing system provides for further processing of the biological sample without opening the collection tube (i.e. without un-securing or removing the plug from the collection tube). The dispensing system further provides dispensing of the processed biological sample without opening the collection tube).

14 Claims, 10 Drawing Sheets

(51) Int. Cl.
 *B01L 3/00* (2006.01)
 *G01N 1/02* (2006.01)
(52) U.S. Cl.
 CPC ........... *B01L 3/5023* (2013.01); *B01L 3/5029* (2013.01); *B01L 2200/025* (2013.01); *B01L 2200/026* (2013.01); *B01L 2200/0605* (2013.01); *B01L 2200/0689* (2013.01); *B01L 2300/042* (2013.01); *B01L 2300/049* (2013.01); *B01L 2300/069* (2013.01); *B01L 2300/123* (2013.01); *B01L 2400/0406* (2013.01); *G01N 2001/028* (2013.01)
(58) Field of Classification Search
 CPC ....... B01L 2200/026; B01L 2200/0689; B01L 2200/0605; B01L 2300/0689; B01L 2300/042; B01L 2300/049; B01L 2300/069; B01L 2300/123; B01L 2400/0406; A61B 10/0051; A61B 10/00
 See application file for complete search history.

(56) References Cited

U.S. PATENT DOCUMENTS

| | | | |
|---|---|---|---|
| 2004/0245125 A1* | 12/2004 | Trkulja | A61B 10/0045 206/223 |
| 2011/0021950 A1* | 1/2011 | Daniels | A61B 10/02 600/562 |
| 2015/0353919 A1* | 12/2015 | Mielke | B01L 3/5029 435/6.12 |
| 2016/0100786 A1* | 4/2016 | Nishio | A61B 5/150503 600/576 |
| 2017/0036205 A1* | 2/2017 | Bishop | B01L 3/0272 |
| 2018/0036733 A1* | 2/2018 | Williams | B01L 3/50825 |
| 2018/0267030 A1* | 9/2018 | Fiechtner | G01N 33/54306 |
| 2019/0201888 A1* | 7/2019 | Mcintyre | B01L 3/508 |
| 2019/0210188 A1* | 7/2019 | Pastori | B24C 9/006 |
| 2020/0206732 A1 | 7/2020 | Henrick | |
| 2023/0194389 A1* | 6/2023 | Ji | B01L 3/0272 422/501 |

* cited by examiner

```
┌─────────────────┐
│      501        │
│ Removing a      │
│ sample          │
│ collector from  │
│ sealed          │
│ packaging       │
└────────┬────────┘
         ↓
┌─────────────────┐
│      502        │
│ Collecting a    │
│ biological      │
│ sample with the │
│ sample          │
│ collector       │
└────────┬────────┘
         ↓
┌─────────────────┐
│      503        │
│ Inserted the    │
│ collected       │
│ biological      │
│ sample into a   │
│ collection tube │
└────────┬────────┘
         ↓
┌─────────────────┐
│      504        │
│ Removably       │
│ attaching the   │
│ sample          │
│ collector and   │
│ the collection  │
│ tube            │
└────────┬────────┘
         ↓
┌─────────────────┐
│      505        │
│ Removing a      │
│ handle from the │
│ sample          │
│ collector,      │
│ forming a       │
│ dispensing      │
│ system          │
└────────┬────────┘
         ↓
┌─────────────────┐
│      507        │
│ Unsecuring a    │
│ cap of the      │
│ dispensing      │
│ system          │
└────────┬────────┘
         ↓
┌─────────────────┐
│      508        │
│ Dispensing the  │
│ biological      │
│ sample          │
└─────────────────┘
```

BIOLOGICAL SAMPLE COLLECTION AND DISPENSING SYSTEM

BACKGROUND

Swabs are commonly used in the collection of biological samples for diagnostic analysis. Conventional swabs, generally referred to as collection swabs, may consist of a thin cylindrical shaped plastic or wooden piece, where one end is used for holding the swab via a hand of the user (handle end) and the other end is for collecting biological specimens. The specimen collection end (collection end) typically includes nylon, cotton, or similar absorbent material (tip) attached to aid in specimen collection.

Conventional collection swabs come in many formats and shapes and are made of many different types of materials. The collection tip is made of some hydrophilic material (like cotton or nylon) that is glued to the plastic or wood material. After collection of a biological sample the collection swab is usually immersed in a transport or culture media in a container (tube) so that the collected material can be safely and stably maintained or transported for downstream applications. Other collection swabs are used to collect and store biological samples in a dry format. These conventional collection swabs are described in EP0643131, WO2004/086979 and U.S. Pat. No. 5,091,316.

Figure 1A:
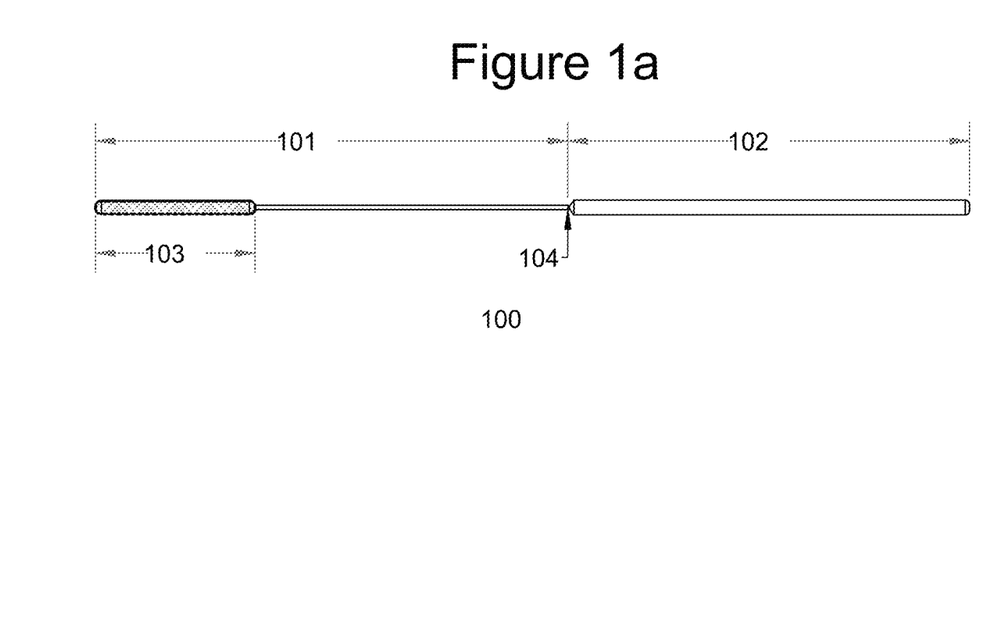
FIG. 1a is a representative conventional collection swab.
Figure 1B:
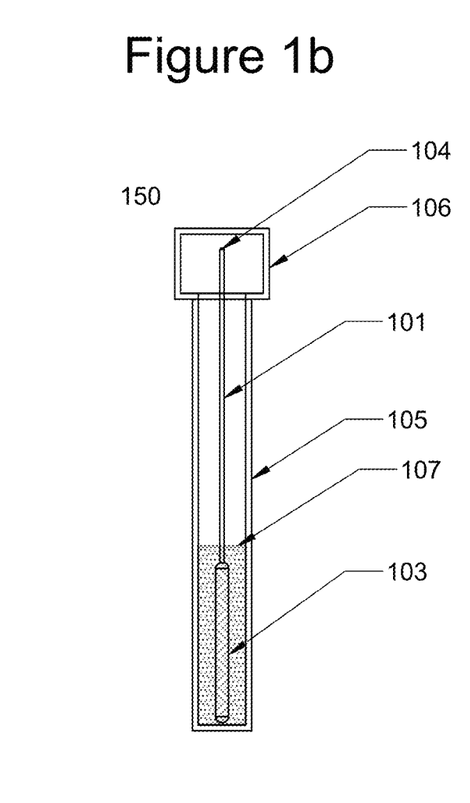
FIG. 1b is a representative conventional collection tube having received the representative conventional collection swab.

A representative conventional swab and collection tube are shown in FIGS. 1a and 1b. The representative conventional swab 100 is made of plastic (e.g. polystyrene) and has a collection end 101 and a handle end 102. The collection end has a tip 103, such as flocked with nylon or polyester fibers. The diameter of the collection end is approximately 0.2 inches (5.08 mm). The handle end 102 has a greater diameter than the collection end 101.

Further the representative conventional swab has a break point 104 that allows the swab to be broken after collection of a sample and introduction of the collection end into a tube or collection device (see FIG. 1b). The representative conventional swab is approximately 6 inches long (152.4 mm) and the break point is approximately in the middle (i.e. from about 2 to 3 inches (50 mm to 80 mm)) from the end of the tip 103.

The break point of conventional swabs corresponds to the collection tube that accommodates the collection end of the conventional swab. A conventional collection tube 150 is shown in FIG. 1b. The representative conventional collection tube includes a tube 105 and a lid 106. The representative conventional swab is received by the tube 105 and the representative conventional swab is broken at the break point 104 such that the collection end 103 is inside the tube 105 and the handle end 102 is discarded, as shown in FIG. 1b. The lid 106 is screwed on to the tube 105 and the biological sample is now collected and available for downstream applications.

The collection tube may include a liquid media for maintaining the collected biological sample in a stable and viable condition. FIG. 1b illustrates a collected swab in liquid media 107. Typically, conventional collection tubes have waterproof lids that may be a snap on cap or a screw in or screw on lid.

Conventional collection swabs and conventional collection tubes lack the ability to further process the biological sample without opening the collection tube. Rather, conventional collection swabs and conventional collection tubes act solely as a container to store and ship the biological sample for further analysis, such as processing that yields molecular or protein based information from the host from which the biological sample was collected or from a pathogen (viral, bacterial, fungal, and the like) that resides in or is associated with the biological sample.

Further, conventional collection swabs and conventional collection tubes lack the ability to further process the biological sample without opening the collection tube. As used herein, "without opening the collection tube" means that the plug sealing the collection tube is not removed or unattached from the tube, but rather stays in-situ.

It is therefore desirable for a collection swab to be received by a collection tube for further processing without opening the collection tube. It is further desirable for the received collection swab and tube to allow for dispensing of the processed sample without opening the collection tube.

FIGURES

FIG. 5b is a pictorial representation of the method represented in FIG. 5a.

SUMMARY

In aspects, a sample collector for collecting a biological sample, the sample collector including a plug for sealing a collection tube, the plug including an attaching mechanism for removably attaching the plug to the collection tube, the attaching mechanism being below a ridge; the ridge, the ridge having a diameter larger than a body of the plug and generally in the center of the plug; and a dispensing orifice for dispensing a controlled volume of liquid from the collection tube, the dispensing orifice extending through the plug and being cavitated; a collection end, the collection end being attached to a bottom of the plug, wherein the collection end includes a swab for the biological sample collection; a handle, the handle being attached to a top of the plug, wherein the handle includes a break point for removing the handle.

In aspects a biological sample collecting system for containing a biological sample, the biological sample collecting system including a plug for sealing a collection tube, the plug including an attaching mechanism for removably attaching the plug to the collection tube, the attaching mechanism being below a ridge; the ridge, the ridge having a diameter larger than a body of the plug and generally in the center of the plug; and a dispensing orifice for dispensing a controlled volume of liquid from the collection tube, the dispensing orifice extending through the plug and being cavitated; a handle, the handle being attached to a top of the plug, wherein the handle includes a break point for removing the handle; a collection tube configured to receive the plug, the sample collection tube including a flexible tube configured for holding liquid that is a flexible plastic material; a receiving portion that is a material less flexible than the flexible tube, the receiving portion configured for receiving the plug via a receiving mechanism, wherein the receiving mechanism is complimentary to the attaching mechanism being below the ridge.

In aspects, a biological sample dispensing system for dispensing a biological sample, the biological sample dispensing system including a plug for sealing a collection tube, the plug including an attaching mechanism for removably attaching the plug to the collection tube, the attaching mechanism being below a ridge; the ridge, the ridge having a diameter larger than a body of the plug and generally in the center of the plug; and a dispensing orifice for dispensing a controlled volume of liquid from the collection tube, the dispensing orifice extending through the plug and being cavitated; a collection end, the collection end being attached to a bottom of the plug, wherein the collection end includes a swab for the biological sample collection; a collection tube removably attached to the plug, the sample collection tube including a flexible tube configured for holding liquid, the flexible tube is a flexible plastic material; a receiving portion that is a material less flexible than the flexible tube, the receiving portion configured to receive the plug via a receiving mechanism, wherein the receiving mechanism is complimentary to the attaching mechanism being below the ridge of the plug.

In aspects, a method for collecting and processing a biological sample with a biological sample and dispensing system, the method including collecting a biological sample using a sample collector, the sample collector including a plug for sealing a collection tube, the plug including an attaching mechanism configured to removably attach the plug to the collection tube, the attaching mechanism being below a ridge; the ridge, the ridge having a diameter larger than a body of the plug and generally in the center of the plug; and a dispensing orifice for dispensing a controlled volume of liquid from the collection tube, the dispensing orifice extending through the plug and being cavitated to dispense the controlled volume of liquid from 20 to 40 milliliters per drop; a collection end, the collection end being attached to a bottom of the plug, wherein the collection end includes a swab for the biological sample collection; a handle, the handle being attached to a top of a cap, wherein the handle includes a break point for removing the handle; and a cap, the cap configured to seal the collection tube by removable attachment to the plug via a cap securing mechanism, wherein the attaching mechanism of the plug further being above the ridge, where the cap securing mechanism is complimentary to the attaching mechanism; and the cap including a first orifice for dispensing the biological sample when aligned with the dispensing orifice when the cap is in a dispensing position on the plug; inserting the biological sample into the collection tube; removably attaching the sample collector to the collection tube, the collection tube including a flexible tube configured for holding liquid, the flexible tube is a flexible plastic material; a receiving portion that is a material less flexible than the flexible tube, the receiving portion configured to receive the plug via a receiving mechanism, wherein the receiving mechanism is complimentary to the attaching mechanism being below the ridge; removing the handle from the sample collector forming the biological sample dispensing system; dispensing the biological sample via the dispensing orifice when the cap is in a dispensing position.

DETAILED DESCRIPTION

A biological sample collection system and dispensing system is described. The biological sample collection system provides for collection and processing of a biological sample (i.e. bodily fluids collected from nose, throat, or other mucosal membrane of an animal or human). The biological sample collection system includes a sample collector and a collection tube. The sample collector provides a structure for sealing the biological sample in the collection tube for further processing without opening the collection tube, and may provide a structure for collecting the biological sample. When the sample collector and collection tube are removably attached the dispensing system is formed. The dispensing system provides for further processing of the biological sample without opening the collection tube (i.e. without un-securing or removing the plug from the collection tube). The dispensing system further provides dispensing of the processed biological sample without opening the collection tube).

Figure 2A:
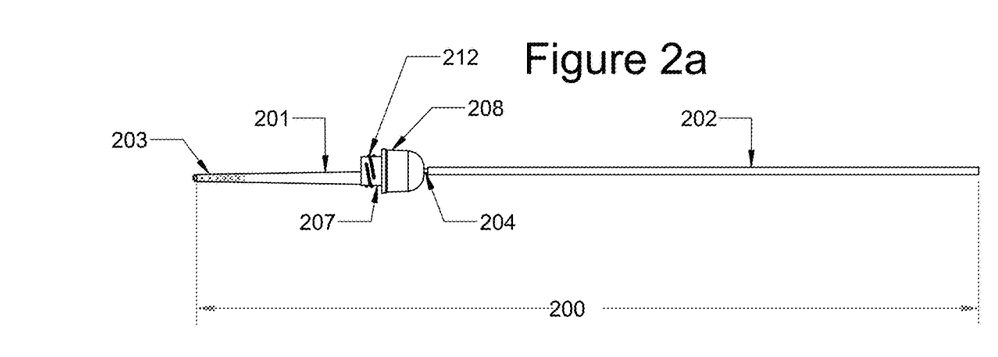
FIG. 2a represents a sample collector of a biological sample collecting system.
Figure 5A:
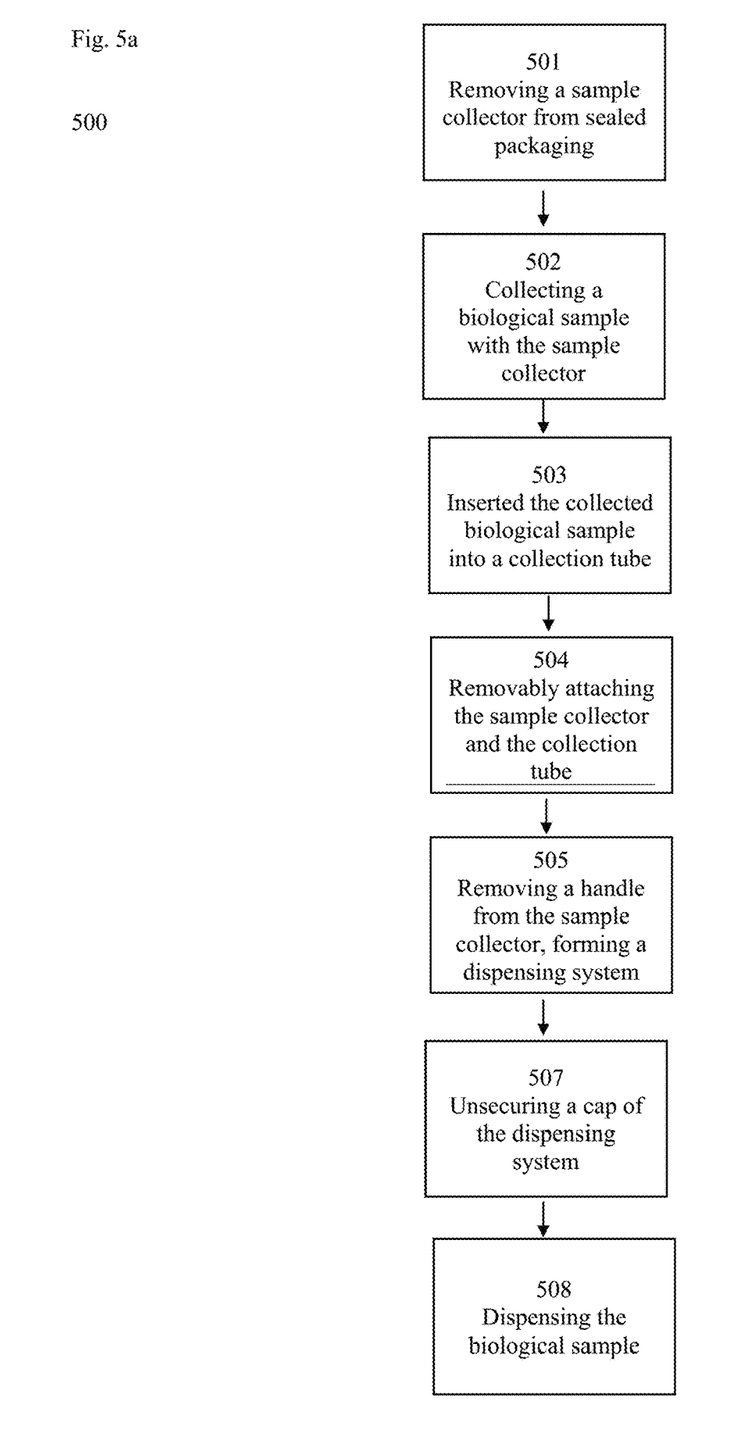
FIG. 5a represents a method for collecting and processing the biological sample using a biological sample and dispensing system.
Figure 5B:
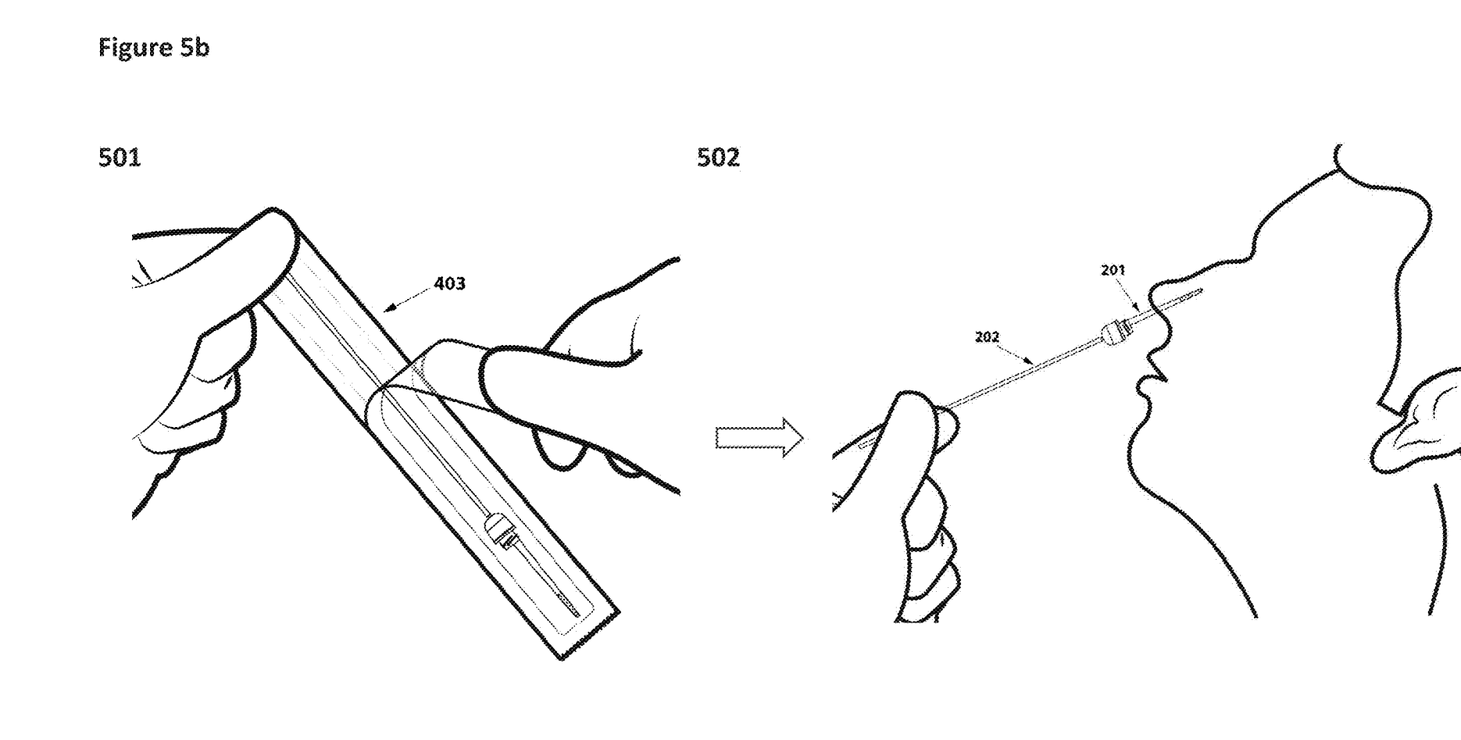

FIG. 2a represents a sample collector 200 of a biological sample collection system 250 (shown in 503 of FIG. 5b). The sample collector 200 includes a plug 207. The sample collector 200 may further include a collection end 201, a handle 202, a break point 204, and a cap 208.

Figure 2B:
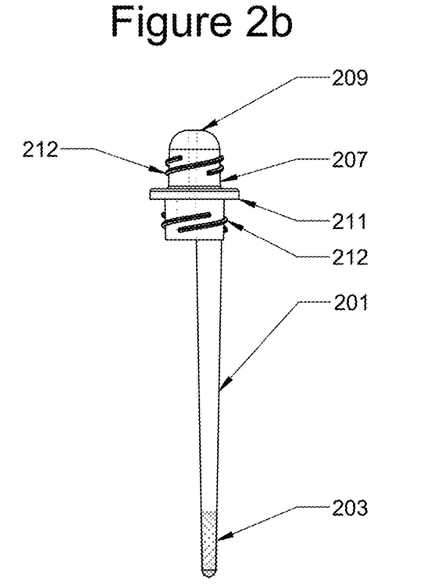
FIG. 2b represents a collection end and plug of the sample collector.

FIG. 2b represents the collection end and plug of the sample collector 200 of the biological sample collection system. The collection end 201 may include a swab 203. The collection end 201 and swab 203 are that of a conventional collection swab, such as the representative conventional collection swab 101 and 103, respectively. The collection end 201 and plug 207 together may be from 40 to 60 millimeters (mm) in length.

The plug 207 of the sample collector 200 includes an attaching mechanism 212, a ridge 211, and a dispensing orifice 209. The plug 207 may include a delivery orifice 210. The plug 207 allows sealing of the biological sample collection system to form a dispensing system, and for processing of a biological sample without opening the collection tube. The collection end 201 may be attached to the plug 207, where the collection end and plug may be formed as a single piece. The plug 207 is of a diameter to be received by a collection tube 301 (see FIGS. 3a-3e), such as from 4 to 12 mm in diameter. The plug is of a length to be received by the collection tube 301 and to receive the cap 208, such as from 9 to 12 mm.

The attaching mechanism 212 and ridge 211 removably attach and seal the sample collector in a collection tube 301 (see FIGS. 3a-3e). The attaching mechanism 212 is below the ridge 211 for receiving the collection tube 301 in removable attachment. The attaching mechanism 212 may also be above the ridge 211 for receiving the cap 208 in removable attachment. The attaching mechanism 212 receives and attaches the collection tube 301 to the plug 207 to form the dispensing system 300 (see FIGS. 3b-3e). The attaching mechanism 212 may be threads (shown in FIG. 2b), a snap cap, or a groove and lock and combinations thereof.

The ridge 211 is generally in the center of the plug 207, such as from 4 to 5 mm from the bottom of the plug 207. The ridge 211 is circular having a diameter that is greater than the body of the plug 207 and has a height of from 0.5 to 2 mm. The ridge 211 provides that the plug 207 and collection end 201 only enters the collection tube 301 a distance until the ridge 211 contacts the collection tube 301. The ridge 211 also seals the collection tube 301, which may include media and the collection end 201 having the biological sample, to form the dispensing system 300.

The dispensing orifice 209 extends through the plug 207 to allow dispensing of a controlled volume of liquid from the collection tube 301 for further processing and analysis. For example, the processed biological sample may be dispensed from the collection tube 301 for polymerase chain reaction (PCR) analysis. The dispensing orifice 209 opens generally on the top of the plug 207 and extends through the plug 207 to open on the bottom plug 207 (as shown in FIGS. 2e and 2f). The dispensing orifice is cavitated to allow dispensing of controlled volumes of liquid per drop, where the dispensing orifice may be cavitated to allow dispensing of approximately 20 to 40 microliters per drop.

When the plug 207 includes the delivery orifice 210, it extends through the plug 207 to allow introduction of liquid into the collection tube 301 to contact the biological sample for processing. For example, buffers, reagents, or water may be delivered into the collection tube 301. The delivery orifice 210 opens on an upper side of the plug 207 and extends through the plug 207 to open on the bottom of the plug 207 (as shown in FIGS. 2e and 2f). The delivery orifice 210 is from 1 to 2 mm in diameter.

Figure 2C:
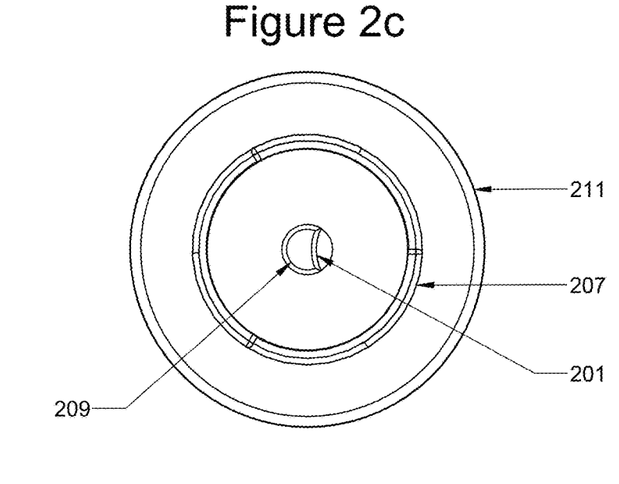
FIG. 2c represents a top down view of the plug.

FIG. 2c is a top down view of the plug 207. This view shows the ridge 211, the dispensing orifice 209 and the collection end 201.

Figure 2D:
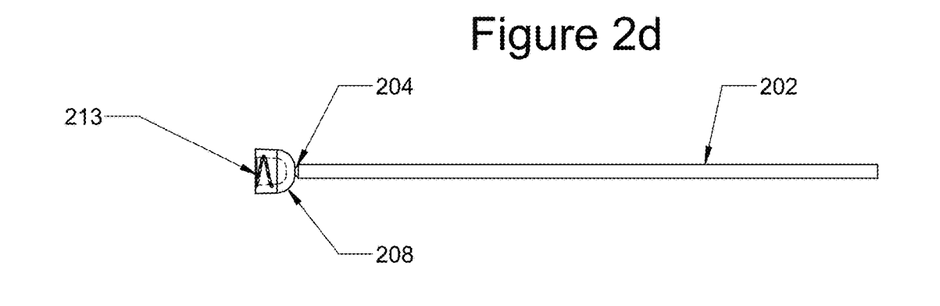
FIG. 2d represents a handle and a cap of the sample collector.
Figure 2E:
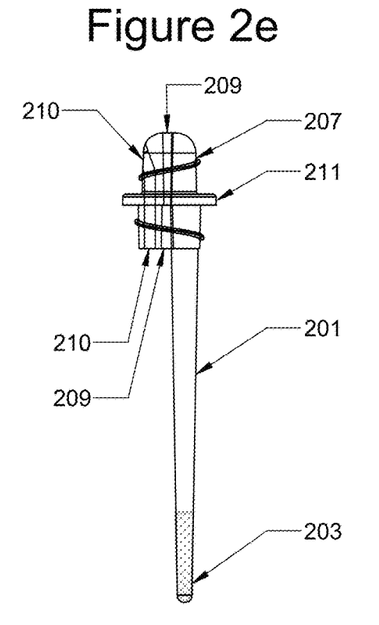
FIG. 2e represents the collection end and plug of the sample collector having a dispensing orifice and delivery orifice.
Figure 2F:
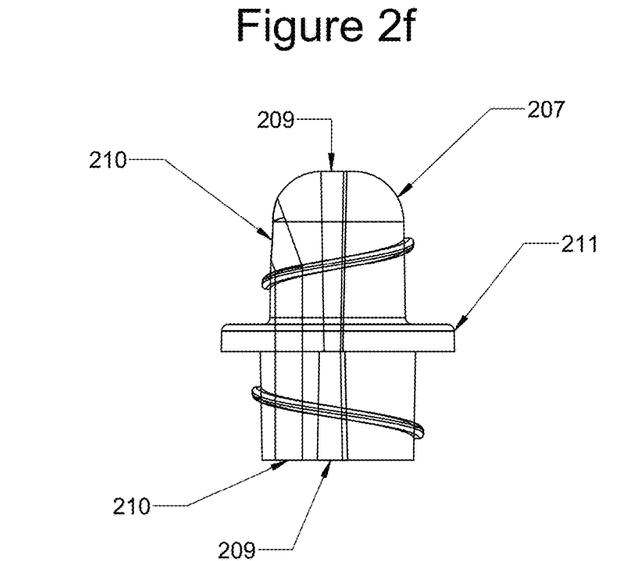
FIG. 2f represents a plug of a sample collector not having a collection end attached.

FIG. 2d represents the handle 202 and the cap 208 of the sample collector 200. The handle 202 is a cylindrical and configured for holding by a user to transport the sample collector during collection and removably attaching the plug 207 to the collection tube 301. The handle is from 100 to 120 mm in length. The handle includes the break point 204 configured for detaching the handle 202 from the cap 208, for example, after collecting a biological sample and securing the plug 207 into the collection tube 301. The break point 204 is structurally weaker than the remainder of the handle 202 such that breaking occurs at the break point 204 and not elsewhere on the handle 202. The handle 202 is attached to the cap 208 at the break point 204.

The cap 208 is configured for attachment to the plug 207 to prevent liquid from entering or leaving the collection tube 301 from the delivery orifice 210 and dispensing orifice 209 when in a lock position (See 506 of FIG. 5b). The cap 208 is of a shape complimentary to the plug 207 to fit over the plug 207, such as a dome shape. The cap 208 includes a cap securing mechanism 213 that this complimentary to the attaching mechanism 212 above the ridge 211 to removablely attach the cap 208 to the plug 207. For example, the cap securing mechanism 213 may be the receiving threads, a snap cap, or the groove insert corresponding to the attachment mechanism 212 of the plug 207.

The cap 208 may include a first orifice 214 that corresponds to the dispensing orifice 209. The first orifice 214 extends through the cap 208. The first orifice 214 aligns with the dispensing orifice 209 when the cap 208 is in a dispensing position (e.g. the cap 208 is twisted one quarter or one half from the lock position to align the first orifice 214 with the dispensing orifice 209) to allow for dispensing of liquid from the collection tube 301 as described in connection with FIG. 2b.

The cap 208 may include a second orifice 215 that corresponds to the delivery orifice 210. The second orifice 215 extends through the cap 208. The second orifice 215 aligns with the delivery orifice 210 when the cap 208 is in a delivery position (e.g. the cap 208 is twisted one quarter or one half from the lock position to align the second orifice 215 with the delivery orifice 210) to allow for delivery of liquid to collection tube 301 as described in connection with FIG. 2b. When the cap 208 includes the first orifice 214 and second orifice 215, the first and second orifice may be staggered, such that when the first orifice 214 is in a dispensing position, the second orifice 215 is not in the delivery position leaving the delivery orifice 210 sealed such that liquid does not exit the delivery orifice when dispensing liquid from the dispensing orifice 209. Likewise, when the second orifice 215 is in a delivery position, the first orifice 214 is not in the dispensing position leaving the dispensing orifice 209 sealed.

FIG. 2e represents the collection end 201 and plug 207 of the sample collector 200 of the biological sample collection system, where the dispensing orifice 209 and delivery orifice 210 are shown is solid lines for illustrative purposes, notwithstanding that the orifices extend through the interior of the plug 207.

FIG. 2f represents a sample collector 200 not having a collection end 201. The plug 207 not having the collection end 201 may be removably attached to a collection tube 301 for facilitating delivery and dispensing of liquids to and from the collection tube 301.

Figure 3A:
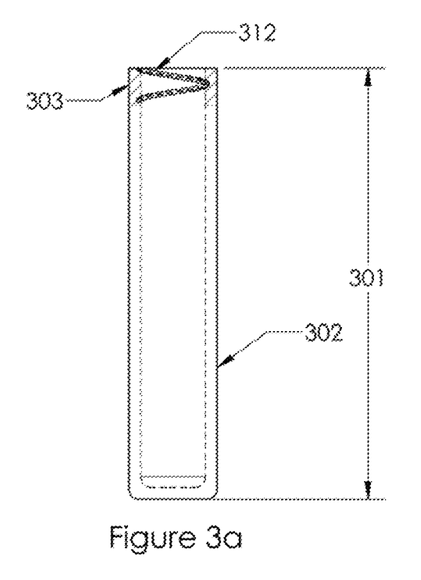
FIG. 3a represents a collection tube of the biological sample collecting system.

FIG. 3a represents a collection tube 301 of the biological sample collecting system. The collection tube 301 is configured for receiving the plug 207 of the sample collector 200 and the collection end 201 of the sample collector 200 and for holding and dispensing liquid. The collection tube 301 is from 30 to 60 mm in height with an outer diameter from 5 to 12 mm. The collection tube 301 includes a flexible tube 302 and a receiving portion 303. The flexible tube 302 is a material, such as flexible plastic of polycarbonate or polyethylene, that holds liquid but is flexible to allow for malleability by a user's fingers, for example, to dispense liquid.

The receiving portion 303 includes a receiving mechanism 312 configured to receive the plug 207. The receiving portion 303 is material that is less flexible than the flexible tube 302, such as a rigid plastic or a thicker portion of the material of the flexible tube 302. The receiving mechanism 312 is complimentary to the attaching mechanism 212 of the plug 207 below the ridge 211 to removably attach the plug 207 to the collection tube 301. For example, the receiving mechanism 312 may be receiving threads, a snap cap, or the groove insert corresponding to the plug 207.

Figure 3B:
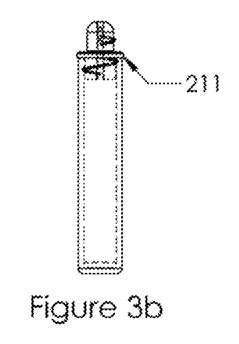
FIG. 3b represents a dispensing system, wherein a sample collector includes a plug not having a collection end attached.

FIG. 3b represents a dispensing system 300, wherein a sample collector 200 includes a plug not having a collection end attached and a collecting tube 301, where the plug 207 is removably attached to the collection tube 301 via the receiving mechanism 312 and the attaching mechanism 212 to form the dispensing system 300.

Figure 3C:
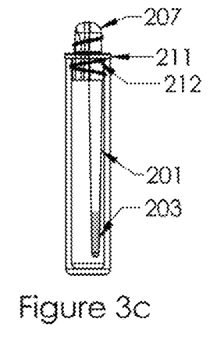
FIG. 3c represents a dispensing system, wherein a sample collector includes a plug and a collection end having a swab.

FIG. 3c represents a dispensing system 300, wherein the sample collector 200 includes a plug 207 and a collection end 201 having a swab 203, where the plug 207 is removably attached to the collection tube 301 via the receiving mechanism 312 and the attaching mechanism 212 to form the dispensing system 300.

Figure 3D:
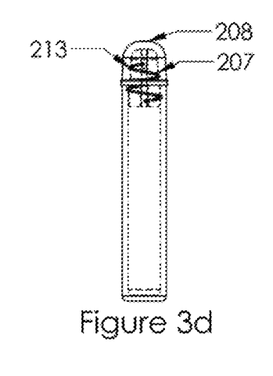
FIG. 3d represents a dispensing system, wherein a sample collector includes a plug not having a collection end attached and a cap.

FIG. 3d represents a dispensing system 300, wherein a sample collector 200 includes a plug 207 not having a collection end attached and a cap 208, where the plug 207 is removably attached to the collection tube 301 via the receiving mechanism 312 and the attaching mechanism 212 to form the dispensing system 300. The cap 208 is removably secured to the plug via a cap securing mechanism 213 and attaching mechanism 212.

Figure 3E:
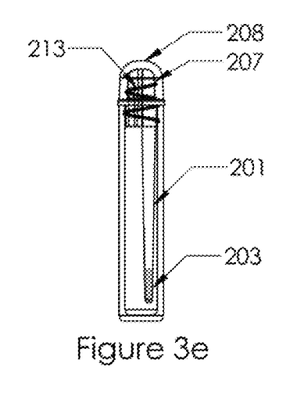
FIG. 3e represents a dispensing system, wherein a sample collector includes a plug, a collection end having a swab, and a cap.

FIG. 3e represents a dispensing system 300, wherein a sample collector 200 includes a plug 207, collection end 201 having a swab 203, and a cap 208, where the plug 207 is removably attached to the collection tube 301 via the receiving mechanism 312 and the attaching mechanism 212 to form the dispensing system 300. The cap 208 is removably attached to the plug via a cap securing mechanism 213 and attaching mechanism 212.

Figure 6A:
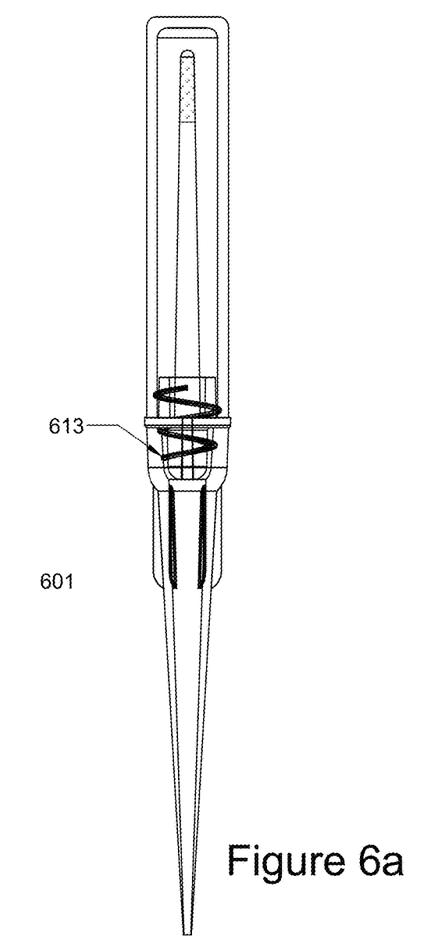
FIG. 6a is a dispensing attachment.
Figures 6B, 6C:
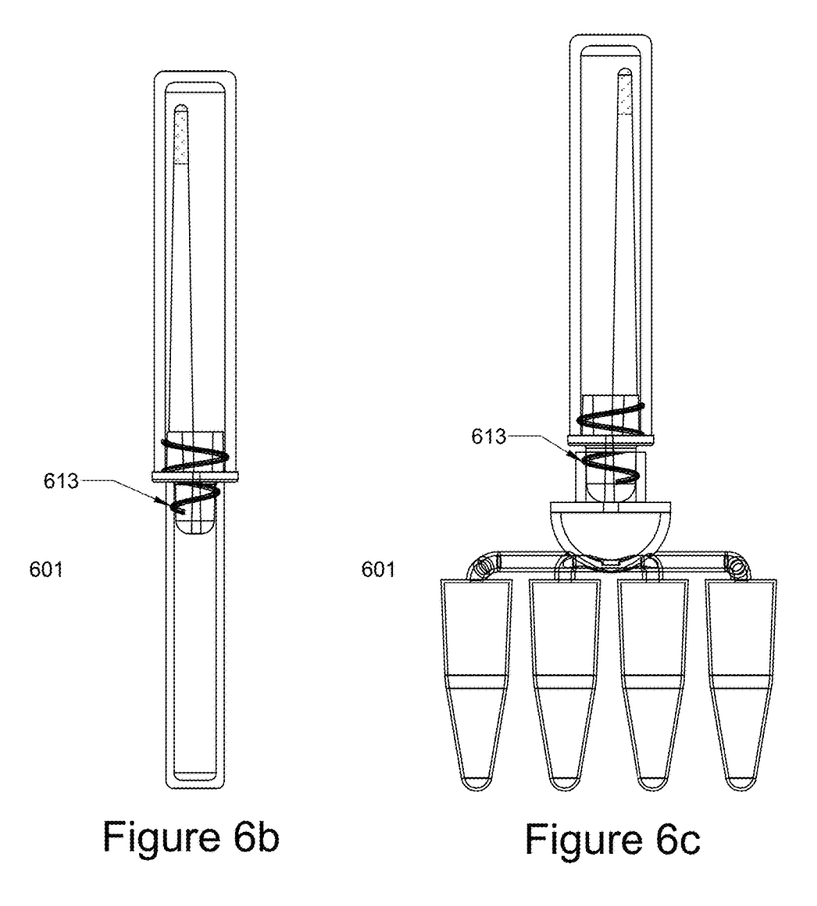
FIG. 6b is a dispensing attachment.
FIG. 6c is a dispensing attachment.

FIGS. 6a, 6b, and 6c represent dispensing systems each having a dispensing attachment 601. The dispensing attachment 601 is configured for additional accuracy (i.e. the location where the biological sample will be dispensed) in dispensing the biological sample from the collection tube 301 via the dispensing orifice 209, such as dispensing to a smaller tube, a second collection tube, or simultaneous dispensing to multiple tubes. The dispensing attachment 601 includes a dispensing attachment securing mechanism 613 that is complimentary to the attaching mechanism 212 to secure the dispensing attachment 601 to the plug 207. For example, the dispensing attachment securing mechanism 613 may be the receiving threads, a snap cap, or the groove insert corresponding to the plug 207. The dispensing attachment securing mechanism 613 removably attaches the dispensing attachment 601 to the plug 207.

FIG. 6a represents a dispensing attachment 601 removably secured to the plug 207, where the dispensing attachment 601 includes a tapered tube (e.g. a pipette tube) to allow accurate delivery of the biological sample to a smaller tube, such as a standard PCR tube.

FIG. 6b represents a dispensing attachment 601 secured to the plug 207, where the dispensing attachment 601 is a collection tube to allow for accurate delivery of the biological sample to the collection tube.

FIG. 6c represents a dispensing attachment 601 secured to the plug 207, where the dispensing attachment 601 include multiple channels to allow accurate, simultaneous delivery of the biological sample to multiple receptacles, such as multiple well plates.

Figure 4:
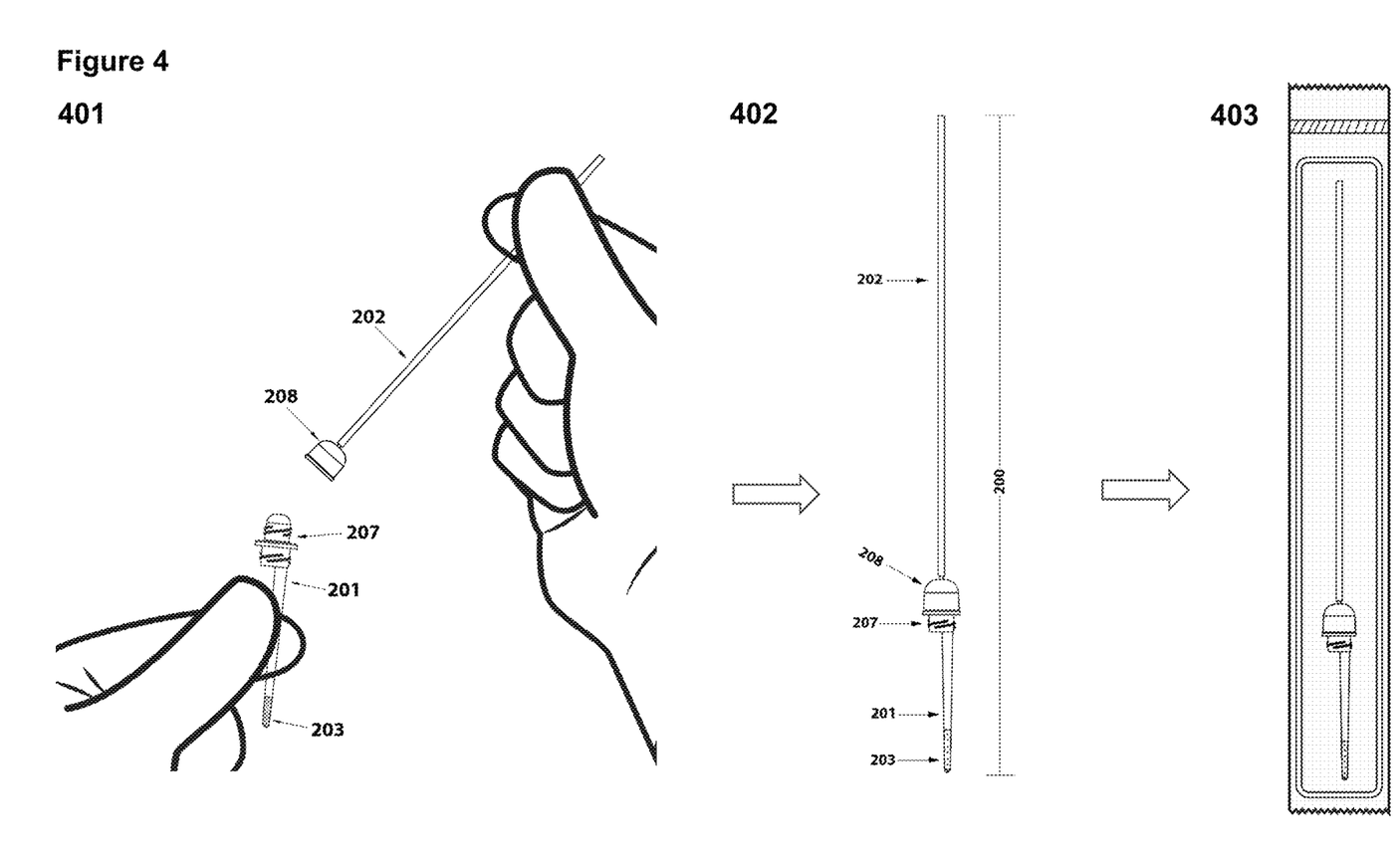
FIG. 4 is a pictorial representation of a method of assembling a sample collector.

FIG. 4 is a pictorial representation of a method of assembling a sample collector 200. Once the handle 202 and the cap 208 are formed as a single piece and the plug 207 and collection end 201 are formed as a single piece, they may be assembled as shown in 401, where the attaching mechanism 212 above the ridge 211 is removably attached to the cap receiving mechanism 213. Once secured, in 402 the sample collector 200 is formed. The sample collector 200 may be sterilized prior to packaging in 403. In 403, the sample collector is packaged in a sealed container, such as in a paper or plastic container.

FIG. 5a is a method 500 for collecting and processing a biological sample using a biological sample and dispensing system and FIG. 5b is a corresponding pictorial representation of the method 500. In 501 of FIG. 5a and FIG. 5b, a sample collector 200 is removed from sealed packaging, such as that described in 403, where the sealed packaging is opened from a handle end of the sample collector 200, such that the handle 202 is grasped by a user.

In 502 of FIGS. 5a and 5b, a biological sample is collected according to collection protocol for the particular biological sample. For example, when the biological sample is a nasal specimen, a swab 203 of the sample collector 200 is inserted into a nose and spun in three to four complete revolutions and removed from the nostril with the biological sample on the swab 203 of the sample collector.

In 503 of FIGS. 5a and 5b, the swab 203 having the biological sample is inserted into a collection tube 301. The collection tube 301 may include a media 307 if the protocol for processing the biological specimen specifies media. For example, when the biological sample is a nasal specimen the media 307 may include standard viral transport media (VTM) or Universal Transport Media (UTM), and buffers configured for use with biological samples. After the biological sample contacts the media, the biological sample is in solution with the media 307, where this solution is referred to as the biological sample.

In 504 of FIGS. 5a and 5b, the plug 207 of the sample collector 200 is removably attaching to the collection tube 301 via the securing mechanism 312 and the attaching mechanism 212, where the collection end 201 will extend into the collection tube 301 up to the ridge 211 where the position of the plug 207 is fully removably attached to the collection tube 301.

In 505 of FIGS. 5a and 5b, the handle is removed from the sample collector 200 via the break point 204 forming a dispensing system. For example, a user may snap the handle at the break point 204 and discard the handle 202. Removing the handle forms a dispensing system, represented in 506 of FIG. 5b, the dispensing system is shown. The dispensing system shown in 506 includes a cap 208, where the cap 208 is fully removably secured to the plug 207 via the cap securing mechanism 213 and the attaching mechanism 212 above the ridge. The fully removably secured plug 207 and cap 208 is a lock positon, such that media contacted with the biological specimen is contained in the collection tube and will not leak or leave the collection tube 301 when inverted.

In 507 of FIGS. 5a and 5b, the cap 208 is unsecured (i.e. removed) from the plug 207 placing the dispensing system in a dispensing position where liquid may be dispensed via the dispensing orifice 209.

In 508, the biological sample is dispensed via the dispensing orifice 209. The biological sample dispensed via the dispensing orifice 209 is volume controlled where each drop is a consistent approximate volume of sample, such as from 20 to 40 microliters per drop. The biological sample may be dispensed into a second collection tube 301 configured for receiving a sample collector including a plug 207 and not including a collection end 201 for further processing and dispensing.

The invention claimed is:

1. A sample collector for collecting a biological sample, the sample collector comprising:
    a plug for sealing a collection tube, the plug comprising:
        an attaching mechanism for removably attaching the plug to the collection tube, the attaching mechanism being below a ridge;

the ridge having a diameter larger than a body of the plug and generally in a center of the plug; and a dispensing orifice for dispensing a controlled volume of liquid from the collection tube, the dispensing orifice extending through the plug and being cavitated;

a collection end, the collection end being attached to a bottom of the plug, wherein the collection end includes a swab for collecting the biological sample;

a handle, the handle being attached to a top of a cap, wherein the handle includes a break point for removing the handle; and the cap, the cap removably attached to the plug via a cap securing mechanism, the cap having a first orifice for dispensing the controlled volume of liquid when aligned with the dispensing orifice when the cap is in a dispensing position on the plug, wherein the attaching mechanism of the plug further being above the ridge, where the cap securing mechanism is complimentary to the attaching mechanism.

2. The sample collector of claim 1, wherein the plug further comprises a delivery orifice for delivering liquid into the collection tube, the delivery orifice extending through the plug adjacent to the dispensing orifice.

3. The sample collector of claim 2, wherein the cap further comprises a second orifice for delivering liquid when aligned with the delivery orifice when the cap is in a delivery position on the plug, wherein the second orifice is staggered from the first orifice, where when the cap is in the delivery position, the first orifice is not aligned with the dispensing orifice and is not in the dispensing position.

4. The sample collector of claim 1, further comprising the collection tube configured to receive the collection end and the plug, the collection tube comprising a flexible tube configured for holding liquid, where the flexible tube is a flexible plastic material;

a receiving portion that is a material less flexible than the flexible tube, the receiving portion configured for receiving the plug via a receiving mechanism, wherein the receiving mechanism is complimentary to the attaching mechanism being below the ridge of the plug.

5. The sample collector of claim 4, wherein the collection tube is from 30 to 60 millimeters in height and from 5 to 12 millimeters in outer diameter.

6. The sample collector of claim 4, wherein the attaching mechanism is selected from the group consisting of threads, a receiving portion of a snap, or a groove and lock mechanism and combinations thereof.

7. A biological sample collecting system for containing a biological sample, the biological sample collecting system comprising:

a plug for sealing a collection tube, the plug comprising an attaching mechanism for removably attaching the plug to the collection tube, the attaching mechanism being below a ridge;

the ridge having a diameter larger than a body of the plug and generally in a center of the plug; and a dispensing orifice for dispensing a controlled volume of liquid from the collection tube, the dispensing orifice extending through the plug and being cavitated;

a handle, the handle being attached to a top of a cap, wherein the handle includes a break point for removing the handle;

a collection tube configured to receive the plug, the collection tube comprising a flexible tube configured for holding liquid that is a flexible plastic material;

a receiving portion that is a material less flexible than the flexible tube, the receiving portion configured for receiving the plug via a receiving mechanism, wherein the receiving mechanism is complimentary to the attaching mechanism being below the ridge; and the cap, the cap removably attached to the plug via a cap securing mechanism, the cap having a first orifice for dispensing the controlled volume of liquid when aligned with the dispensing orifice when the cap is in a dispensing position on the plug, wherein the attaching mechanism of the plug further being above the ridge, where the cap securing mechanism is complimentary to the attaching mechanism.

8. A biological sample dispensing system for dispensing a biological sample, the biological sample dispensing system comprising:

a plug for sealing a collection tube, the plug comprising an attaching mechanism for removably attaching the plug to the collection tube, the attaching mechanism being below a ridge;

the ridge having a diameter larger than a body of the plug and generally in a center of the plug; and a dispensing orifice for dispensing a controlled volume of liquid from the collection tube, the dispensing orifice extending through the plug and being cavitated;

a collection end, the collection end being attached to a bottom of the plug, wherein the collection end includes a swab for collection of the biological sample;

the collection tube removably attached to the plug, the collection tube comprising a flexible tube configured for holding liquid, the flexible tube is a flexible plastic material;

a receiving portion that is a material less flexible than the flexible tube, the receiving portion configured to receive the plug via a receiving mechanism, wherein the receiving mechanism is complimentary to the attaching mechanism being below the ridge of the plug; and a cap, the cap removably attached to the plug via a cap securing mechanism, the cap having a first orifice for dispensing the controlled volume of liquid when aligned with the dispensing orifice when the cap is in a dispensing position on the plug, wherein the attaching mechanism of the plug further being above the ridge, where the cap securing mechanism is complimentary to the attaching mechanism.

9. The system of claim 8, wherein the plug further comprises a delivery orifice for delivering liquid into the collection tube, the delivery orifice extending through the plug adjacent to the dispensing orifice.

10. The system of claim 9, wherein the cap further comprises a second orifice for delivering liquid when aligned with the delivery orifice when the cap is in a delivery position on the plug, wherein the second orifice is staggered from the first orifice, where when the cap is in the delivery position, the first orifice is not aligned with the dispensing orifice and is not in the dispensing position.

11. The system of claim 8 further comprising
a dispensing attachment configured for dispensing liquid from the collection tube with accuracy, the dispensing attachment in removable attachment to the plug via a dispensing attachment securing mechanism, wherein
the attaching mechanism of the plug further being above the ridge, where the dispensing attachment securing mechanism is complimentary to the attaching mechanism.

12. A method for collecting and processing a biological sample with a biological sample collector and dispensing system, the method comprising:
collecting the biological sample using a sample collector, the sample collector comprising
a plug for sealing a collection tube, the plug comprising
an attaching mechanism configured to removably attach the plug to the collection tube, the attaching mechanism being below a ridge;
the ridge having a diameter larger than a body of the plug and generally in a center of the plug; and
a dispensing orifice for dispensing a controlled volume of liquid from the collection tube, the dispensing orifice extending through the plug and being cavitated to dispense the controlled volume of liquid from 20 to 40 milliliters per drop;
a collection end, the collection end being attached to a bottom of the plug, wherein the collection end includes a swab for collection of the biological sample;
a handle, the handle being attached to a top of a cap, wherein the handle includes a break point for removing the handle; and
a cap configured to seal the collection tube by removable attachment to the plug via a cap securing mechanism, wherein
the attaching mechanism of the plug further being above the ridge, where the cap securing mechanism is complimentary to the attaching mechanism; and the cap comprising a first orifice for dispensing the controlled volume of liquid including the biological sample when aligned with the dispensing orifice when the cap is in a dispensing position on the plug;
inserting the biological sample into the collection tube;
removably attaching the sample collector to the collection tube, the collection tube comprising
a flexible tube configured for holding liquid, the flexible tube is a flexible plastic material;
a receiving portion that is a material less flexible than the flexible tube, the receiving portion configured to receive the plug via a receiving mechanism, wherein the receiving mechanism is complimentary to the attaching mechanism being below the ridge;
removing the handle from the sample collector forming the biological sample dispensing system;
dispensing the controlled volume of liquid including the biological sample via the dispensing orifice when the cap is in a dispensing position.

13. The method of claim 12, wherein
the biological sample collection includes media for contacting the biological sample.

14. The method of claim 12 wherein the swab of the collection end is selected from
the group consisting of nylon, cotton, paper, and synthetic fiber.

* * * * *